Figure 1:
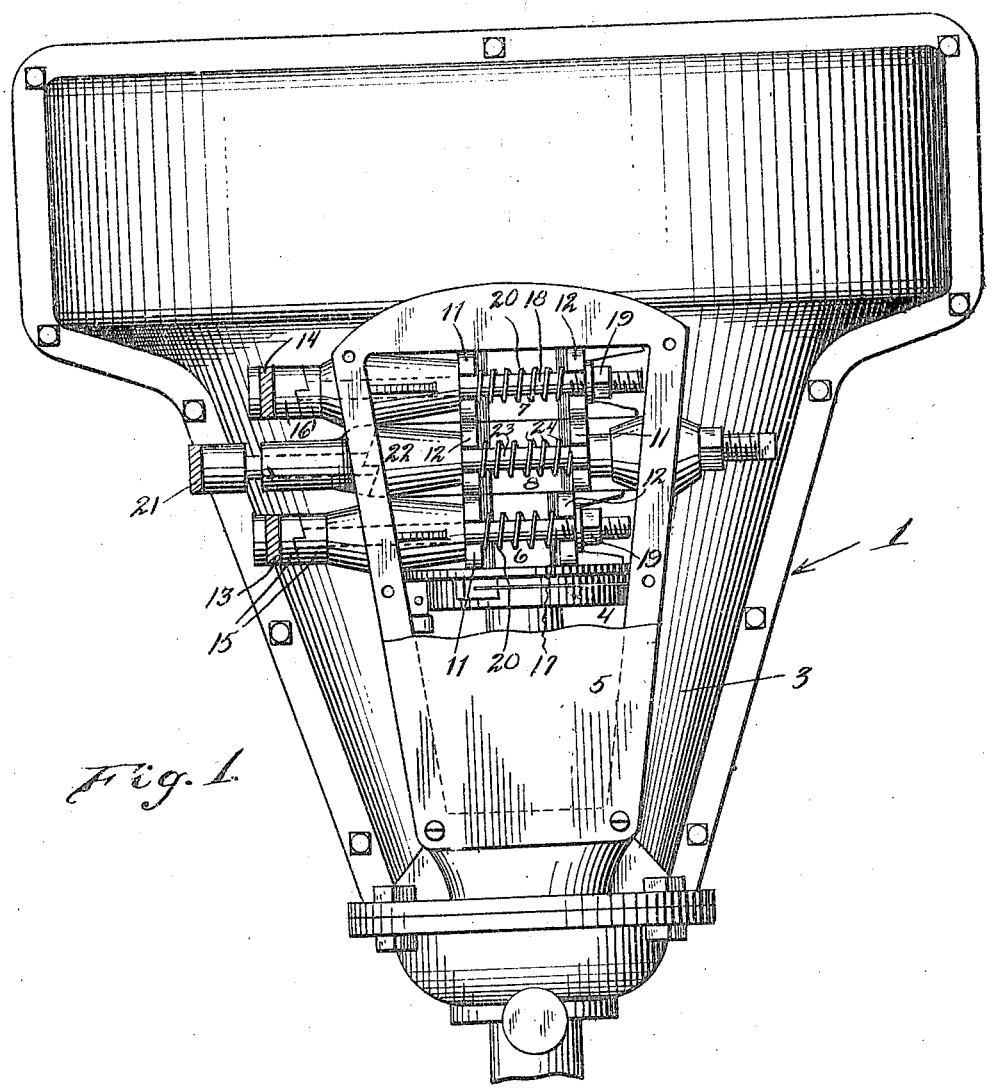

T. L. WHITE.
TRANSMISSION BAND.
APPLICATION FILED FEB. 10, 1915.

1,198,091.

Patented Sept. 12, 1916.
2 SHEETS—SHEET 1.

Witnesses
J. Milton Jester
C. Everett

Inventor
Thomas L. White
By D. A. Gowrick
Attorney

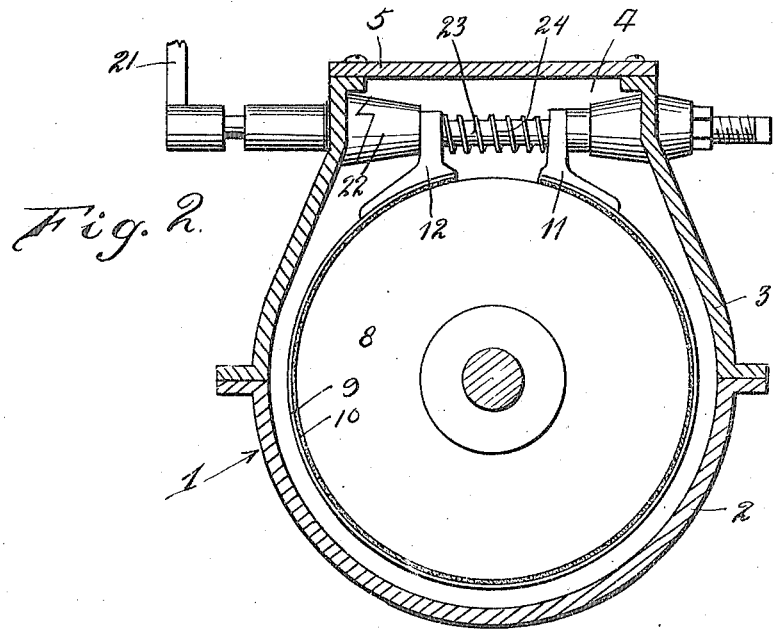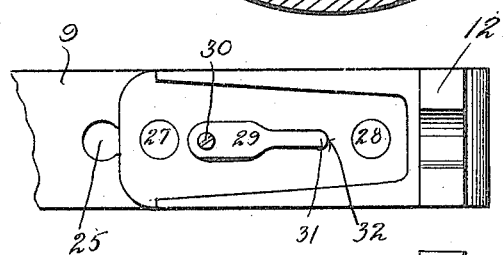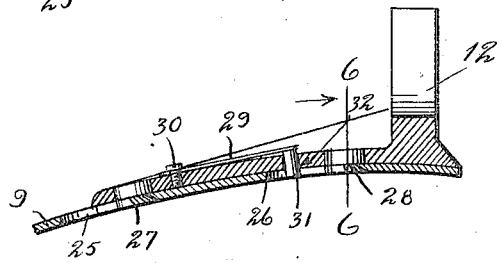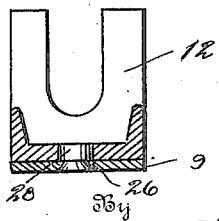

UNITED STATES PATENT OFFICE.

THOMAS LOCKE WHITE, OF IDAHO CITY, IDAHO.

TRANSMISSION-BAND.

1,198,091. Specification of Letters Patent. Patented Sept. 12, 1916.

Application filed February 10, 1915. Serial No. 7,417.

*To all whom it may concern:*

Be it known that I, THOMAS LOCKE WHITE, a citizen of the United States, residing at Idaho City, in the county of Boise and State of Idaho, have invented certain new and useful Improvements in Transmission-Bands, of which the following is a specification.

My invention relates to transmission bands for automobiles, and particularly to that type used on Ford automobiles.

It is well known that the transmission of a Ford automobile comprises three rotating drums: One for the low speed, one for the reverse, and one for the brake. Each of these drums is partially encircled by a band of resilient steel, lined with asbestos or a similar material, and provided at its ends with stationary ears. These drums, bands, and their associated parts to be described are inclosed by a cover provided with a small opening in its top closed by a hand plate. The ears at the left of the bands on the brake and reverse drums bear against bosses on the inner wall of the transmission cover and hold the left ends stationary while the ends carrying the right ears are movable. These pairs of ears are slotted for the reception of rods which pass through these bosses and through other bosses formed on the outer wall of the cover. A spring is disposed around each of these rods between the ears, and the right ears are held in place by nuts threaded upon the rods and engaging washers contacting with the right ears. In order to reverse the automobile or to apply the brake, it is necessary that these right ears be moved to the left to cause the bands to grip the drums. This is accomplished by means of foot pedals secured upon the outer ends of the rods, the outer faces of the outer bosses and the inner faces of the bosses on the pedals having cam faces whereby forward movement of either pedal will cause the corresponding rod to be moved to the left, with the result that the band will grip the drum. The right ear of the band encircling the middle or low speed drum is held stationary against an adjustable member extending through a boss on the inside and on the outside of the right hand side of the transmission cover, while the free left ear is engaged by a member secured on the inner end of a rod passing through a boss on the left side of the transmission cover and carrying at its end a foot pedal. This actuating member is moved by a cam action caused by forward movement of the pedal associated therewith. This pair of ears is slotted for the reception of a guide rod and is held apart by a spring. The bands on all the drums are identically the same and are interchangeable from one drum to another. It is well known in the art that after an automobile has been used for a considerable length of time, the asbestos linings of the bands become worn and have to be replaced. Owing to the peculiar construction of the transmission and transmission cover of the Ford automobile, in order to replace any or all of the bands it is necessary to remove and replace the entire transmission cover, an operation requiring several hours to perform.

The object of the present invention is to provide a transmission band for Ford automobiles so constructed that it may be removed and replaced through the small opening in the top of the transmission cover, thereby eliminating the tedious and time consuming operation now necessary.

Essentially, the object of the present invention resides in the provision of a Ford transmission band having one or both ears removable from the body portion of the band.

An important object is the provision of a transmission band of this character which is provided with a safety catch whereby the removable ear is prevented from accidental displacement while in use.

Figure 3:
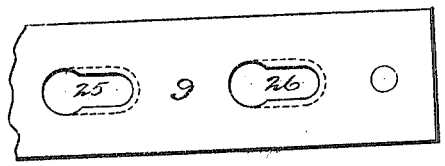

With these and other objects and advantages in view, such as simplicity, commercial practicability, efficiency and the general improvement of the art, the invention consists in the novel construction and arrangement of parts to be hereinafter more fully described and claimed, and illustrated in the accompanying drawings, in which:

Figure 1 is a plan view of the transmission case of a Ford automobile showing the hand plate partly broken away to expose the drums and their associated parts and showing the bands in place and constructed in accordance with my invention, Fig. 2 is a cross sectional view thereof taken at the low speed drum, Fig. 3 is a plan view of one end of the band, Fig. 4 is a plan view of one end of the band having the detachable ear in place, Fig. 5 is a longitudinal sectional view therethrough, and Fig. 6 is a cross sectional view on the line 6—6 of Fig. 4.

Referring more particularly to the drawings, the numeral 1 designates the transmission case of a Ford automobile which comprises the lower portion 2 and the removable cover 3, the cover 3 being provided with the opening 4 closed by a hand plate 5. The numerals 6, 7 and 8 designate, respectively, the brake, reverse and low speed drums. Each of these drums is encircled by a band 9 having the usual asbestos lining 10 and provided with the ordinary stationary slotted ear 11 and a slotted removable ear 12 to be hereinafter described in detail.

The numerals 13 and 14 designate the foot pedals for contracting the bands on the drums 6 and 7, respectively, by means of the cam members 15 and 16 and the rods 17 and 18 passing through the ears and having nuts 19 threaded upon their ends. Springs 20 are disposed between each pair of ears. The numeral 21 designates the foot pedal for operating the band 9 on the low speed drum 8 by means of the cam actuated member 22 engaging the removable ear 12 slidable upon a guide rod 23. A spring 24 is disposed between this pair of ears.

The operation of the drums and their associated parts forms no portion of the present invention and will not be described, although the parts have been described somewhat in detail for the purpose of explaining the application and advantages of applicant's invention.

In order that the ear 12 may be removable, I form its connection with the band as follows: The band is provided with keyhole slots 25 and 26, the underside of the band being beveled at the sides and ends of the narrow portions of the slots as shown to form retaining edges. The ear 12 is provided on its underside with lugs 27 and 28 welded or otherwise suitably secured in place. Through the major portion of their peripheries the lugs are provided with grooves beveled the same as the keyhole slots to form retaining flanges. The ear 12 is engaged upon the band 9 by inserting the lugs 27 and 28 within the large openings of the keyhole slots 25 and 26, and then sliding the ear toward the adjacent end of the band, the narrow portions of the keyhole slots engaging within the grooves in the lugs, and the beveled edges contacting. The ear will thus be held upon the band firmly and securely.

In order that the ear may be prevented from accidental movement sufficient to permit disengagement of the lugs from the slots, I provide a safety catch comprising a leaf spring 29 secured as at 30 upon the ear 12 and provided upon its free end with a projection 31 passing through an opening 32 in the base of the ear and engaging within the slot 26.

Assuming that the transmission of a Ford automobile is equipped with my bands having removable ears, when it is desired to remove a band it is necessary first to remove the hand plate 5 which will expose the interior mechanism to view. Assuming for the sake of explanation that it is the slow speed band which it is desired to remove, the operation is as follows: The rod 23 is first removed from the transmission case, after releasing it from the cam 22 by withdrawal of a taper pin which secures it to the rod. The ear 12 is then removed by disengaging the projection 31 on the spring 29 from the slot 26 and then sliding the ear along the band until the lugs 27 and 28 are disposed in the large ends of the keyhole slots 25 and 26, whereupon the ear may be lifted from the band. The operator then grasps the stationary ear 11 and pulls upwardly upon it, whereupon the band will slide around the drum. The flexible nature of the band permits its ensuing partial straightening as it is pulled out of the transmission case. The band is replaced by inserting its slotted end at the edge of the drum and pressing it downwardly, the natural tendency of the band to conform to the drum causing it to encircle the drum. The band is pushed down in this manner until the stationary ear 11 is in its proper place after which the ear 12 is reëngaged upon the band. The rod 23 is then replaced and engaged in the forks of the ears 11 and 12. This operation is of course the same for all of the bands.

It will be readily understood that the removable ear may be either at the left or at the right on each drum, and that both ears may be made removable if desired.

Having thus described my invention what I claim is:

1. An automobile transmission band comprising a strip of resilient material, an ear slidably engageable thereon, and means for preventing displacement of said ear.

2. An automobile transmission band comprising a strip of resilient material, an ear slidably engageable thereon, and a spring catch for preventing displacement of said ear.

3. An automobile transmission band comprising a curved strip of flexible material, an ear slidably engageable thereon, and a spring catch on said ear and engaging said strip for preventing displacement of said ear.

4. An automobile transmission band comprising a curved strip of flexible material, an ear slidably engageable upon the one end thereof, and a spring catch on said ear and engaging a hole in said strip for preventing displacement of said ear.

5. An automobile transmission band comprising a curved strip of flexible material, and a removable ear having a keyhole slot and lug connection with one end thereof.

6. An automobile transmission band comprising a curved strip of flexible material, provided adjacent to one end with keyhole slots, a removable ear provided upon its base with lugs engageable within said slots, and a spring catch on said ear and having a projection passing through a hole in the base of said ear and into one of said slots.

7. An automobile transmission band comprising a strip of resilient material, an ear detachably engageable on one end thereof, and a spring catch for preventing displacement of said ear.

8. An automobile transmission band having on one end thereof a detachable ear and a spring catch on said ear engaging said band and preventing the displacement of said ear.

In testimony whereof I hereto affix my signature in the presence of two witnesses.

THOMAS LOCKE WHITE.

Witnesses:
    S. L. HODGIN,
    FLEDA M. HARTMAN.